United States Patent
Sumikawa et al.

(10) Patent No.: US 11,562,602 B2
(45) Date of Patent: Jan. 24, 2023

(54) DATA PROCESSING APPARATUS AND DATA COLLECTING SYSTEM

(71) Applicant: SUBARU CORPORATION, Tokyo (JP)

(72) Inventors: Ryuichi Sumikawa, Tokyo (JP); Tomoyuki Okada, Tokyo (JP); Yosuke Takebayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 164 days.

(21) Appl. No.: 16/741,275

(22) Filed: Jan. 13, 2020

(65) Prior Publication Data

US 2020/0312049 A1 Oct. 1, 2020

(30) Foreign Application Priority Data

Mar. 26, 2019 (JP) .............................. JP2019-058086

(51) Int. Cl.
*G07C 5/00* (2006.01)
*G06Q 30/02* (2012.01)
*G05D 1/02* (2020.01)

(52) U.S. Cl.
CPC ........... *G07C 5/008* (2013.01); *G05D 1/0285* (2013.01); *G06Q 30/0208* (2013.01)

(58) Field of Classification Search
None
See application file for complete search history.

(56) References Cited

U.S. PATENT DOCUMENTS

| | | | |
|---|---|---|---|
| 9,305,310 B2* | 4/2016 | Radhakrishnan | G06Q 30/0283 |
| 9,911,170 B2* | 3/2018 | Kim | G06Q 10/04 |
| 11,023,990 B2* | 6/2021 | Choksi | H04L 67/18 |
| 2010/0185359 A1 | 7/2010 | Tauchi et al. | |
| 2012/0023033 A1* | 1/2012 | Tomasz | G06Q 30/0208 705/345 |
| 2015/0199632 A1* | 7/2015 | Chander | G06Q 10/06311 705/7.13 |

(Continued)

FOREIGN PATENT DOCUMENTS

| | | |
|---|---|---|
| JP | 08-136271 A | 5/1996 |
| JP | 2002-150343 A | 5/2002 |

(Continued)

OTHER PUBLICATIONS

Japanese Notice of Reasons for Refusal issued in corresponding Japanese Patent Application No. 2019-058086, dated Aug. 2, 2022, with English translation.

*Primary Examiner* — Hunter B Lonsberry
*Assistant Examiner* — Paysun Wu
(74) *Attorney, Agent, or Firm* — McDermott Will & Emery LLP

(57) ABSTRACT

A data processing apparatus includes a communicator, an acquisition unit, and an output controller. The communicator is configured to receive request data from a server. The request data contains a content of a request for collection of traveling state data of a vehicle. The acquisition unit is configured to acquire the traveling state data of the vehicle on the basis of the request data received by the communicator. The output controller is configured to cause an output device to output an acquisition status of the traveling state data acquired by the acquiring unit.

4 Claims, 12 Drawing Sheets

(56) References Cited

U.S. PATENT DOCUMENTS

| | | | | |
|---|---|---|---|---|
| 2018/0189713 A1* | 7/2018 | Matthiesen | ............. | H04L 67/16 |
| 2019/0146508 A1* | 5/2019 | Dean | ................... | G05D 1/0274 |
| | | | | 701/26 |
| 2021/0372803 A1* | 12/2021 | van der Vlist | ..... | G01C 21/3492 |

FOREIGN PATENT DOCUMENTS

| | | |
|---|---|---|
| JP | 2002-208093 A | 7/2002 |
| JP | 2005-44058 A | 2/2005 |
| JP | 2009-258927 A | 11/2009 |
| JP | 2010-39639 A | 2/2010 |
| JP | 2012-058052 A | 3/2012 |
| JP | 2017-097500 A | 6/2017 |
| JP | 2017-129465 A | 7/2017 |

* cited by examiner

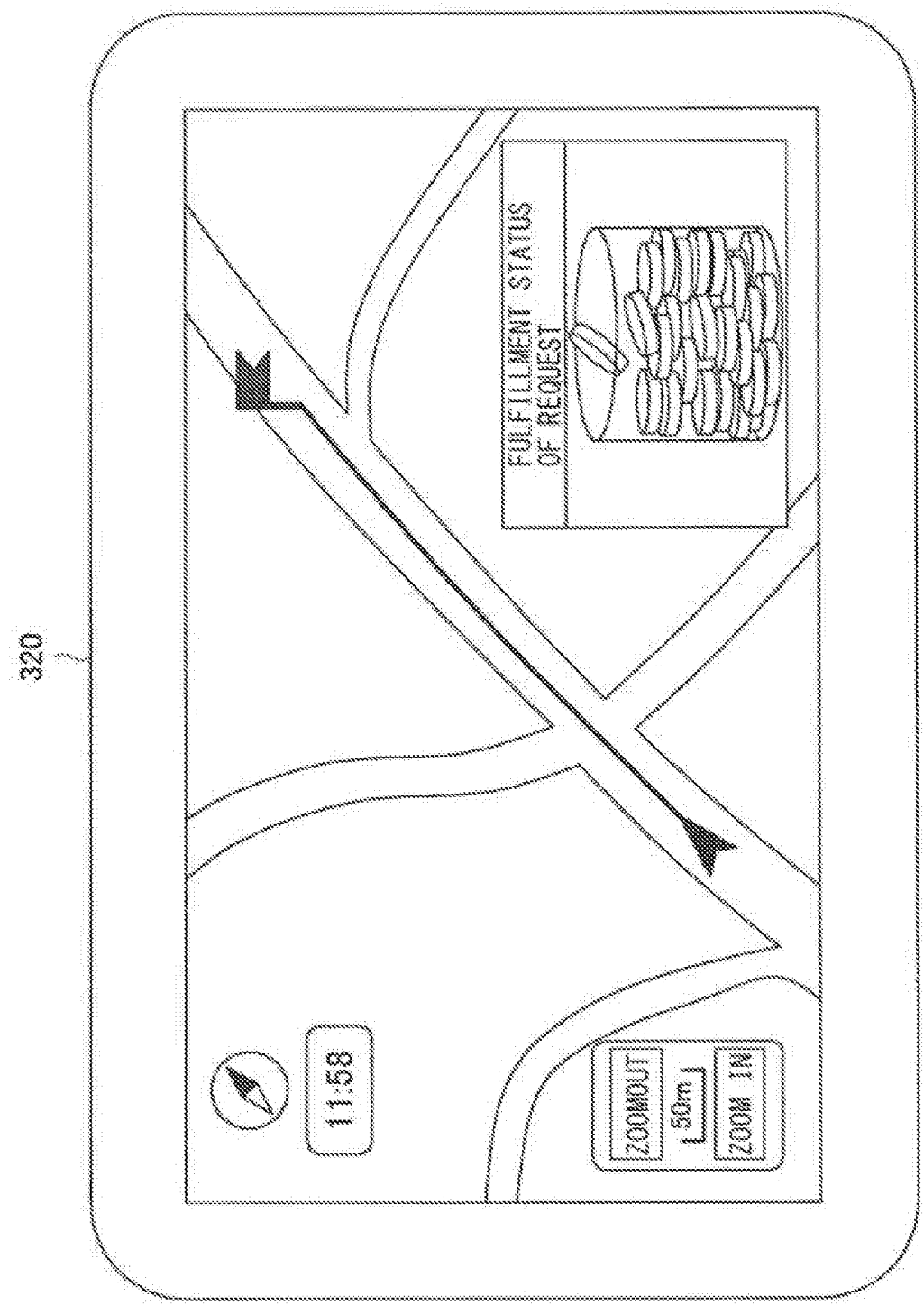

DATA PROCESSING APPARATUS AND DATA COLLECTING SYSTEM

CROSS-REFERENCE TO RELATED APPLICATIONS

The present application claims priority from Japanese Patent Application No. 2019-058086 filed on Mar. 26, 2019, the entire contents of which are hereby incorporated by reference.

BACKGROUND

The disclosure relates to a data processing apparatus and a data collecting system that collects traveling state data on a vehicle.

It has been required to collect traveling state data on a vehicle under various conditions. For example, Japanese Unexamined Patent Application Publication (JP-A) No. 2005-044058 discloses a technique relevant to a data collecting system that includes a server for collecting and providing traveling state data on a vehicle sold in the past, at the time of purchase of a new vehicle of the same type as the sold vehicle.

Another technique is known which provides a driver with various pieces of information on driving. For example, JP-A No. 2010-039639 discloses a technique relevant to a driving diagnosis apparatus that includes a display providing a driver with information on results of a driving condition diagnosis.

SUMMARY

An aspect of the technology provides a data processing apparatus including a communicator, an acquisition unit, and an output controller. The communicator is configured to receive request data from a server. The request data contains a content of a request for collection of traveling state data of a vehicle. The acquisition unit is configured to acquire the traveling state data of the vehicle on the basis of the request data received by the communicator. The output controller is configured to cause an output device to output an acquisition status of the traveling state data acquired by the acquiring unit.

An aspect of the technology provides a data collecting system including a server and a data processing apparatus. The server is configured to store a request data group that includes at least one piece of request data containing a content of a request for collection of traveling state data of a vehicle. The data processing apparatus is to be provided in the vehicle and configured to acquire the traveling state data. The server is configured to transmit the at least one piece of the request data included in the request data group to the data processing apparatus. The data processing apparatus is configured to acquire the traveling state data of the vehicle on the basis of the at least one piece of the request data received from the server, send the acquired traveling state data to the server, and output an acquisition status of the acquired traveling state data to an output device.

An aspect of the technology provides a data processing apparatus including a communicator and circuitry. The communicator is configured to receive request data from a server. The request data contains a content of a request for collection of traveling state data of a vehicle. The circuitry is configured to acquire the traveling state data of the vehicle on the basis of the request data received by the communicator, and cause an output device to output an acquisition status of the acquired traveling state data.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

FIG. 7 is a diagram illustrating an exemplary screen that displays the acquisition status of the traveling state data according to one example embodiment of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

JP-A Nos. 2005-044058 and 2010-039639 fail to disclose a technique for collecting traveling state data in response to a specific request and displaying the fulfillment status of the request. Thus, there is room for an improvement in the provision of data for increasing the motivation of a consignee who collects data to fulfill a request. It is conceived that increasing the motivation of the consignee to fulfill a request helps facilitate the collection of the traveling state data on a vehicle (hereinafter simply referred to as traveling state data) in amount and efficiency.

It is desirable to provide a data processing apparatus and a data collecting system that make it possible to output the fulfillment status of a request and increase the motivation of a consignee for fulfilling the request.

1. First Embodiment

1.1 Outline of Data Collecting System

Figure 1:
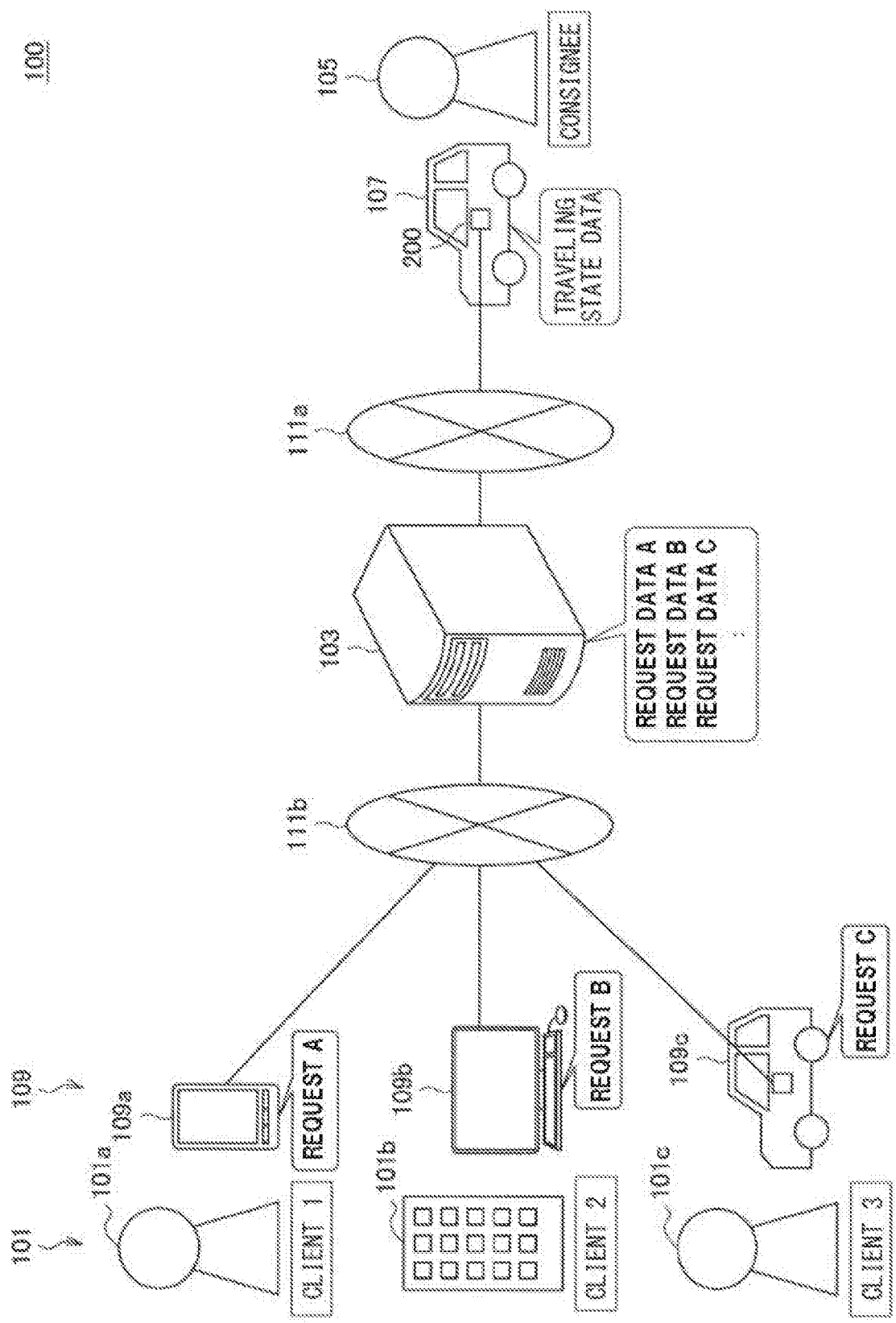
FIG. 1 is a diagram illustrating an exemplary network configuration according to one example embodiment of the technology.

First, an outline of a data collecting system 100 that collects traveling state data according to a first embodiment of the technology will now be described with reference to FIG. 1. FIG. 1 is a diagram illustrating an exemplary network configuration according to the first embodiment of the technology. The data collecting system 100 according to the first embodiment is a system that collects traveling state data. Herein, the data collecting system that collects traveling state data may be simply referred to as data collecting system as appropriate. As illustrated in FIG. 1, a client 101, who places a request for collection of traveling state data (hereinafter referred to as client 101), may send a request for collection of traveling state data to a consignee 105, who receives the request, through a server 103 in the data collecting system 100 according to the embodiment. Additionally, the data collecting system 100 may collect results of the fulfillment of the request by the consignee 105 as the traveling state data.

For example, the data collecting system 100 may cause the server 103 to store request data containing the content of the request for data collection made by the client 101. In one example, requests A, B, and C respectively made by clients 101a, 101b, and 101c may be stored respectively as request data A, request data B, and request data C in the server 103. The server 103 may transmit at least one piece of request data in the request data group stored in the server 103 to a data processing apparatus 200 at the side of the consignee 105 (hereinafter referred to as a consignee-side consignee-side data processing apparatus 200). The consignee 105 may confirm the content of the request in the request data received at the consignee-side data processing apparatus 200, and may undertake to carry out the request. The results of the fulfillment of the request or the traveling state data may be transmitted from the consignee-side data processing apparatus 200 to the server 103. The server 103 may transmit the collected traveling state data to a data processing apparatus 109 at the side of the client 101 (hereinafter referred to as client-side data processing apparatus 109).

The client 101 should not be limited to an individual person and may be a business institution, a municipality, a public institution, or other organizations. In one example, the consignee 105 may correspond to a driver or an owner of a vehicle 107.

The traveling state data may include various pieces of data on traveling of the vehicle 107, such as a condition of the vehicle 107 itself, functions of the vehicle 107, conditions of accessories of the vehicle 107, and an environment around the vehicle 107 including weather and a road surface condition, for example.

The request should not be limited to a particular request and may be any request relevant to collection of the traveling state data. For example, if the client 101 is a road management company, a request may be directed to collection of traveling state data regarding the status of a specific road surface, weather, or the like. If the client 101 is a car manufacturer, a request may be directed to collection of traveling state data regarding how the vehicle sold in the past and its accessories have been used by a user, or the like. If the client 101 is planning a travel or a traveler on a trip, a request may be directed to collection of traveling state data regarding the weather of a destination, scenery of the destination, an arrival time to the destination, traffic congestion, or the like.

1.2. Example Network Configuration

An exemplary network configuration of the data collecting system 100 will now be described with reference to FIG. 1. As illustrated in FIG. 1, the data collecting system 100 includes the server 103 and the consignee-side data processing apparatus 200. The consignee-side data processing apparatus 200 may be disposed in the vehicle 107 and acquire traveling state data. The data collecting system 100 may further include the client-side data processing apparatus 109.

The server 103 may store a request data group that includes at least one piece of request data containing the content of a request for collection of traveling state data made by the client 101. The server 103 may transmit at least one piece of the request data in the request data group to the consignee-side data processing apparatus 200. Additionally, the server 103 may transmit the traveling state data received from the consignee-side data processing apparatus 200 to the client-side data processing apparatus.

The consignee-side data processing apparatus 200 may be coupled to the server 103 via a network 111a to communicate with each other. The consignee-side data processing apparatus 200 may acquire the traveling state data of the vehicle 107 on the basis of the request data received from the server 103. Additionally, the consignee-side data processing apparatus 200 may transmit the acquired traveling state data to the server 103. The consignee-side data processing apparatus 200 will be described in detail later.

The client-side data processing apparatus 109 may be coupled to the server 103 via the network 111b to communicate with each other. The client 101 may place a request for collection of traveling state data using the client-side data processing apparatus 109. The client-side data processing apparatus 109 may transmit the request data to the server 103 via the network 111b. The client-side data processing apparatus 109 should not be limited to a particular apparatus and may be any apparatus configured to communicate with the server 103 and receive request data. The client-side data processing apparatus 109 may include, for example, a smartphone 109a, a personal computer 109b, and an in-vehicle controller 109c, as illustrated in FIG. 1.

1.3. Example Configuration of Consignee-Side Data Processing Apparatus

Figure 2:
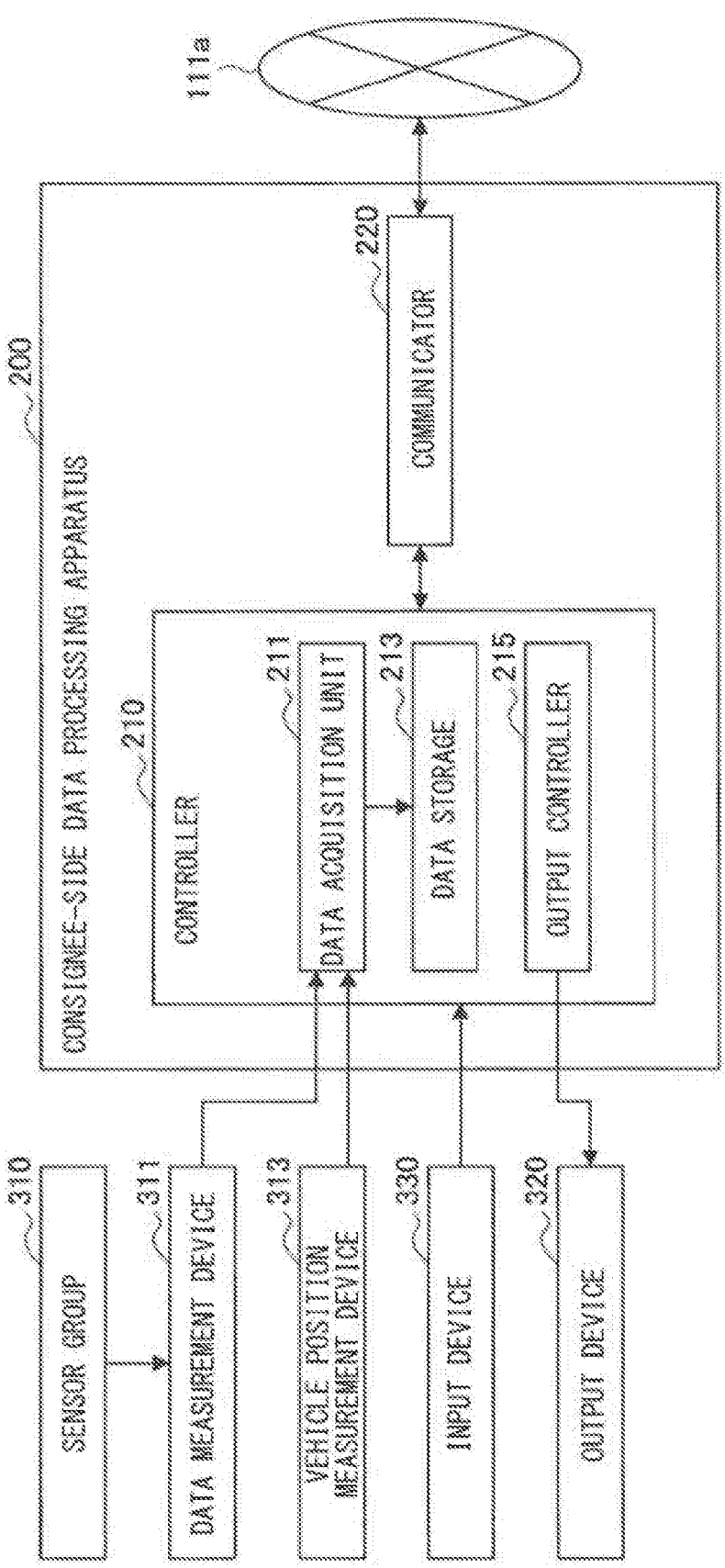
FIG. 2 is a block diagram illustrating an exemplary configuration of a data processing apparatus according to one example embodiment of the technology.

Next, an exemplary configuration of the consignee-side data processing apparatus 200 according to an embodiment of the technology will now be described with reference to FIG. 2. FIG. 2 is a block diagram illustrating the exemplary configuration of the consignee-side data processing apparatus 200 according to the embodiment. The consignee-side data processing apparatus 200 may include a controller 210 and a communicator 220.

The controller 210 may execute control necessary for carrying out various functions of, for example, controlling a sensor group 310 to acquire traveling state data, storing the acquired traveling state data, and outputting the traveling state data to the communicator 220.

The communicator 220 may communicate with an external device outside the consignee-side data processing apparatus 200 via the network 111a.

The consignee-side data processing apparatus 200 may be, for example, an in-vehicle control apparatus. The controller 210 may have functions implemented by, for example, a central processing unit (CPU), a random access memory (RAM), and a read only memory (ROM) that are installed in the in-vehicle control apparatus and operate in cooperation with one another. The communicator 220 may have functions implemented by, for example, a wireless communication interface.

The controller 210 may include a data acquiring unit 211, a data storage 213, and an output controller 215. The data acquiring unit 211 may acquire various pieces of data outputted from a data measurement device 311 and a vehicle position measurement device 313. The data storage 213 may temporarily or permanently store various pieces of data acquired by the data acquiring unit 211. Additionally, the output controller 215 may cause an output device 320 to output an acquisition status of traveling state data, for example.

The data measurement device 311 may detect data on the traveling state of the vehicle 107 on the basis of a sensor signal received from the sensor group 310. The sensor group 310 may include a plurality of sensors that acquire various pieces of data as traveling state data. For example, the sensor group 310 may include at least one of a vehicle wheel speed sensor, a vehicle speed sensor, an acceleration sensor, an angular rate sensor, a temperature sensor, a humidity sensor, a raindrop sensor, an illuminance sensor, a load sensor, a steering angle sensor, a sound collection sensor (microphone), a vibration sensor, an image camera, a radar, or an ultrasonic sensor. The data measurement device 311 may measure a speed, an acceleration rate, and an angular acceleration rate of the vehicle 107, an estimated value of the roughness of the road surface, an ambient temperature, and humidity, for example. Additionally, the data measurement device 311 may capture still images and/or moving images of the surroundings of the vehicle 107 or detect sounds.

The vehicle position measurement device 313 may measure a current position of the vehicle 107. The vehicle position measurement device 313 may be a global positioning system (GPS) antenna, for example.

The output device 320 may output the results of processing executed by the controller 210 to an external device. The output device 320 may be, for example, a display panel, a head-up display, or a speaker. The input device 330 may receive an input from a user of the consignee-side data processing apparatus 200. The input device 330 may be, for example, a button, a touch screen, or a microphone.

Note that the consignee-side data processing apparatus 200 should not be limited to an in-vehicle control apparatus and may be any apparatus that acquires the traveling state data of the vehicle 107. For example, the consignee-side data processing apparatus 200 may be a smartphone or a tablet computer that communicates with various sensors or control apparatuses in the vehicle 107. In this case, the output device 320 and the input device 330 may be integrated with the consignee-side data processing apparatus 200 into a single component. Alternatively, some or all of the sensors in the sensor group 310 may be sensors or functions installed on a smartphone, for example.

1.4. Example Operation of Data Collecting System

Figure 3:
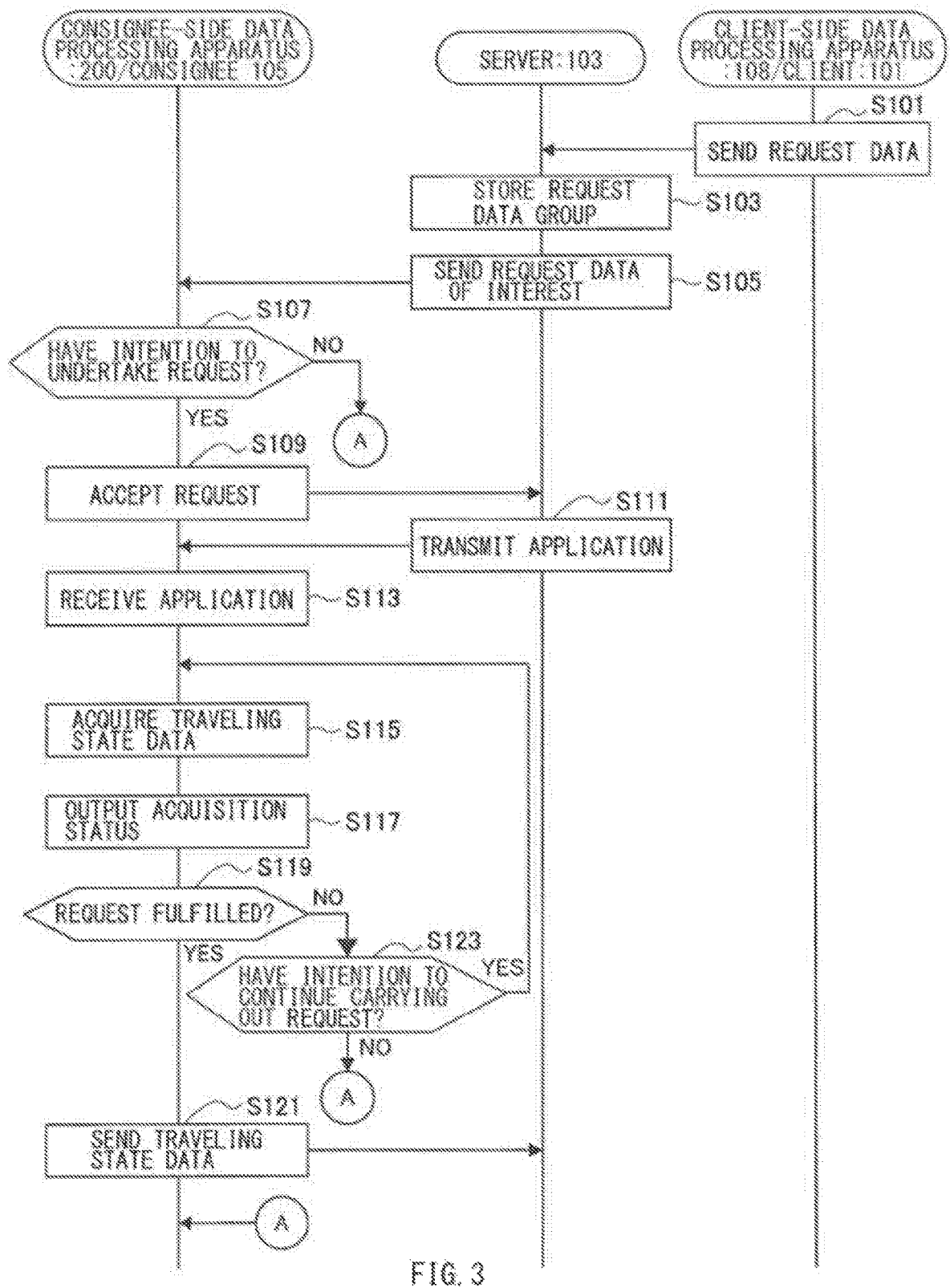
FIG. 3 is a sequence diagram illustrating an exemplary operation of the data collecting system according to one example embodiment of the technology.
Figure 4:
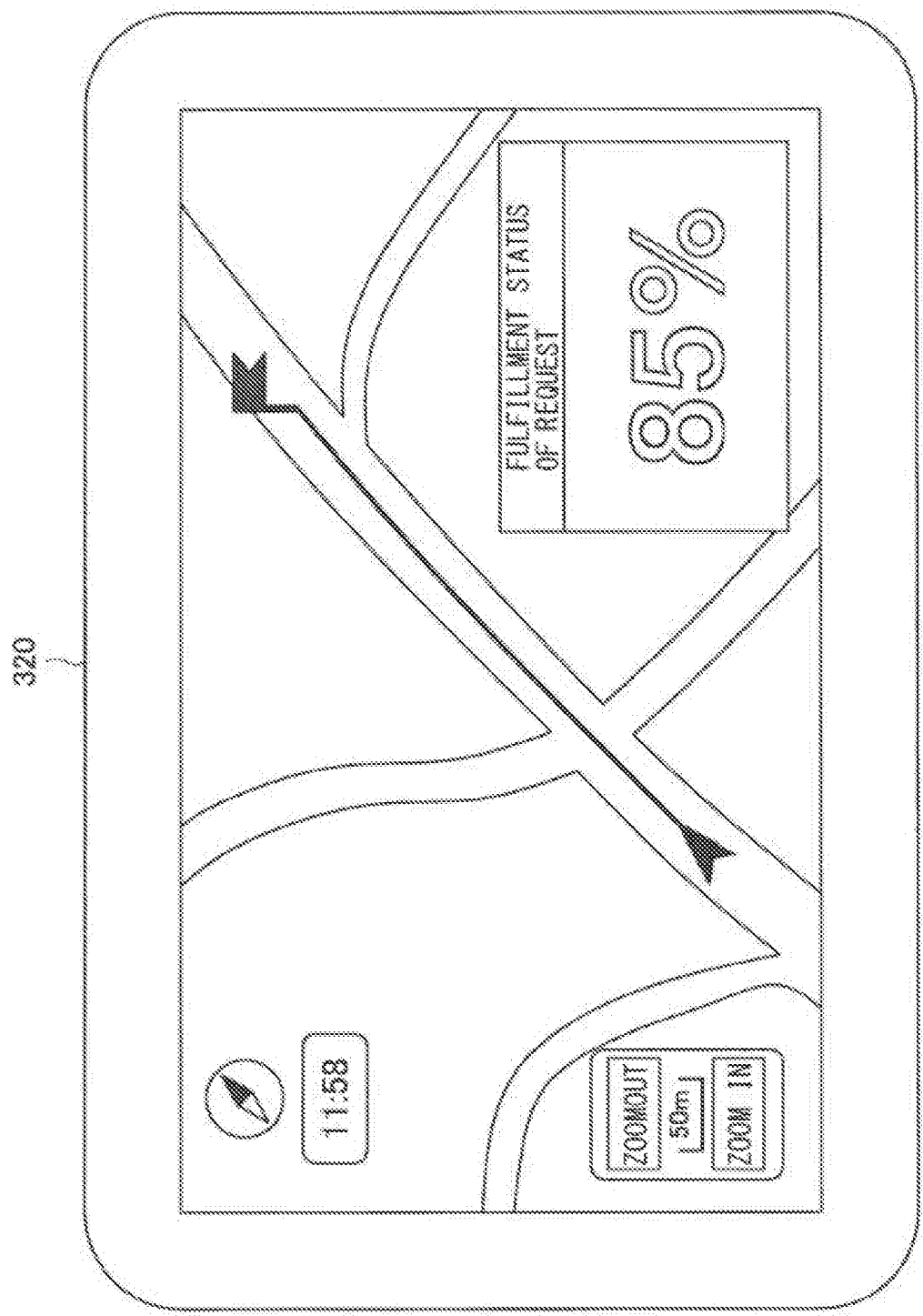
FIG. 4 is a diagram illustrating an exemplary screen that displays an acquisition status of traveling state data.

An exemplary operation of the data collecting system 100 according to one embodiment will now be described with reference to FIGS. 3 and 4. FIG. 3 is a sequence diagram illustrating the exemplary operation of the data collecting system 100 according to the embodiment. FIG. 4 is a diagram illustrating an exemplary screen that displays an acquisition status of traveling state data.

With reference to FIG. 3, the client 101 may first send request data to the server 103 using the client-side data processing apparatus 109 (Step S101). The server 103 may store the request data received from the client-side data processing apparatus 109 as a request data group (Step S103).

The server 103 may select, from the request data group, one or more piece of request data of interest, and send the selected request data to the consignee-side data processing apparatus 200 (Step S105). When receiving the request data, the consignee-side data processing apparatus 200 may determine whether the consignee 105 has an intention to undertake the request indicated by the request data (Step S107). In a case where a plurality of pieces of request data is sent to the consignee-side data processing apparatus 200, the consignee-side data processing apparatus 200 may determine whether the consignee 105 has an intention to undertake any or all of the requests indicated by the pieces of request data. If the consignee 105 is determined as having an intention to undertake the request (Step S107: YES), the request may be accepted in Step S109. In contrast, if the consignee 105 is determined as having no intention to undertake the request (Step S107: NO), the procedure according to the embodiment may end.

After the request is accepted at the consignee-side data processing apparatus 200, the server 103 may transmit an application for displaying an acquisition status of the traveling state data to the consignee-side data processing apparatus 200 (Step S111). After the application is received at the consignee-side data processing apparatus 200 (Step S113), the consignee 105 may start carrying out the request. For example, the data acquiring unit 211 of the consignee-side data processing apparatus 200 may acquire data necessary for fulfillment of the request outputted from the data measurement device 311 or the vehicle position measurement device 313 (Step S115). Additionally, the consignee-side data processing apparatus 200 may provide the driver with information (e.g., a designated driving method or a route) by means of sound, image, or the like, depending on the content of the request.

To carry out the request, the application may cause the consignee-side data processing apparatus 200 to output an acquisition status of the traveling state data (Step S117). In one example illustrated in FIG. 4 in which the output device 320 is a car navigation system, the consignee-side data processing apparatus 200 may cause a display panel of the output device 320 to output the acquisition status of the traveling state data or the fulfillment status of the request. The acquisition status of the traveling state data may be, for example, the rate of the distance in which the vehicle has already travelled relative to a scheduled travel distance required for fulfillment of the request, or the rate of an elapsed time from the start of carrying out the request relative to a scheduled fulfillment time required for fulfillment of the request.

Thereafter, the consignee-side data processing apparatus 200 may determine whether the request indicated by the request data is fulfilled (Step S119). If the request is determined as being fulfilled (Step S119: YES), the consignee-side data processing apparatus 200 may send the traveling state data to the server 103 (Step S121). In a case where the consignee 105 has undertaken a plurality of requests, the traveling state data may be sent to the server 103 every time each request is fulfilled. Alternatively, a plurality of pieces of the traveling state data relevant to the plurality of requests may be collectively sent to the server 103.

In contrast, if the request is determined as not being fulfilled (Step S119: NO), it may be determined whether the consignee 105 has an intention to continue carrying out the request (Step S123). If the consignee 105 has an intention to continue carrying out the request (Step S123: YES), the procedure may return to Step S115 in which traveling state data is acquired. If the consignee 105 has no intention to continue carrying out the request (Step S123: NO), the procedure according to the embodiment may end. The exemplary operation of the data collecting system 100 according to the embodiment has been described above.

According to the present embodiment, the server 103 may send the request data to the consignee-side data processing apparatus 200, the consignee 105 may carry out the request, and the consignee-side data processing apparatus 200 may output the acquisition status of the traveling state data or the fulfillment status of the request to the output device 320. This allows the consignee 105 to be informed of the fulfillment status while the consignee 105 is carrying out the request, which improves motivation of the consignee 105 to fulfill the request. That is, it is possible to output the fulfillment status of the request and further improve the motivation of the consignee 105 to fulfill the request.

In particular, according to the embodiment, the acquisition status of the traveling state data may be quantitatively indicated as the rate of the distance in which the vehicle has already travelled relative to a scheduled travel distance required for fulfillment of the request, or the rate of an elapsed time from the start of carrying out the request relative to a scheduled fulfillment time required for fulfillment of the request. This allows the consignee 105 to be informed of an accurate acquisition status of the traveling state data, which further improves the motivation of the consignee 105.

1.5. Modification Example 1

Figure 5A:
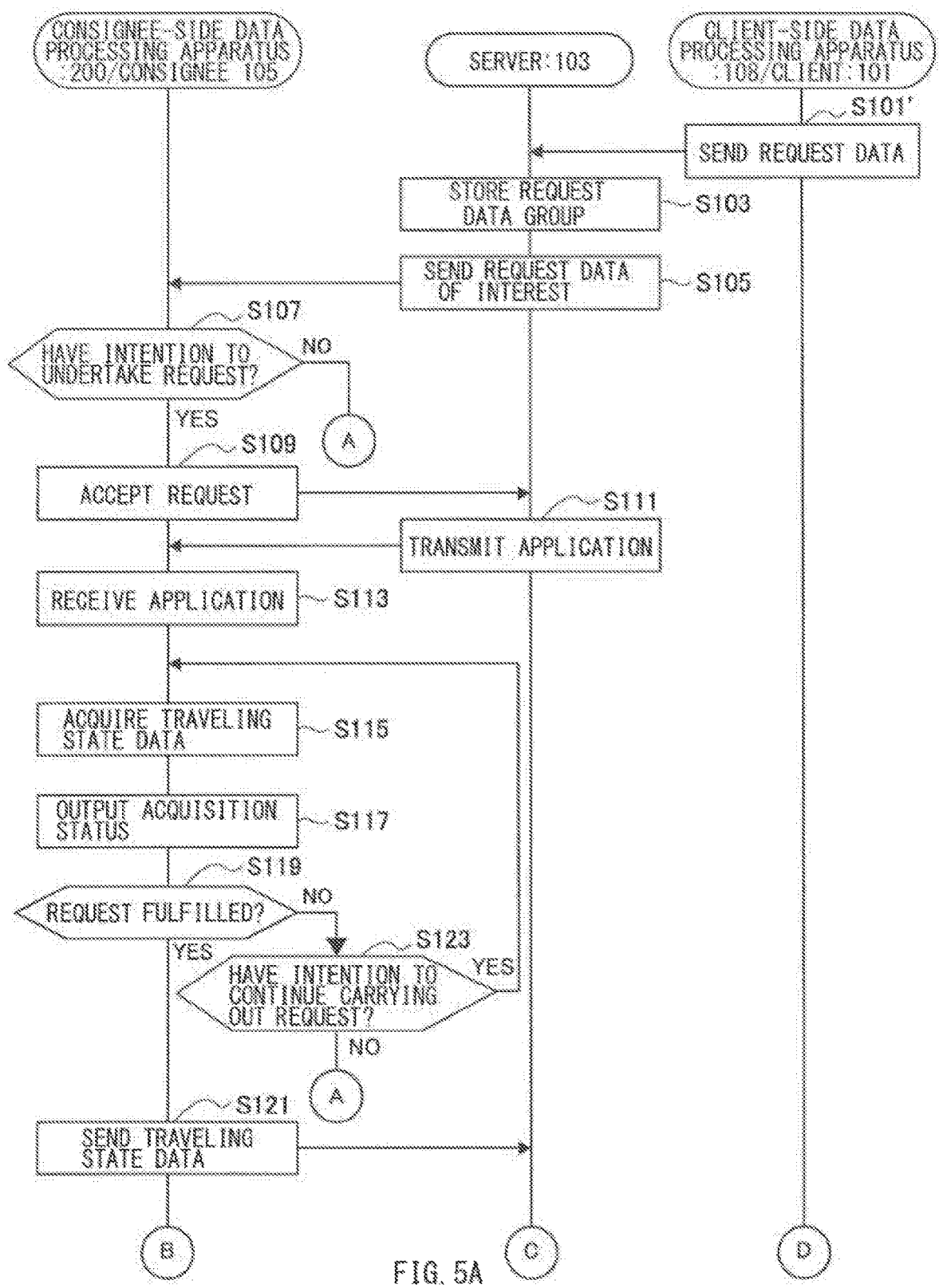
FIG. 5A is a sequence diagram illustrating an exemplary operation of the data collecting system according to the modification example of one example embodiment of the technology.
Figure 5B:
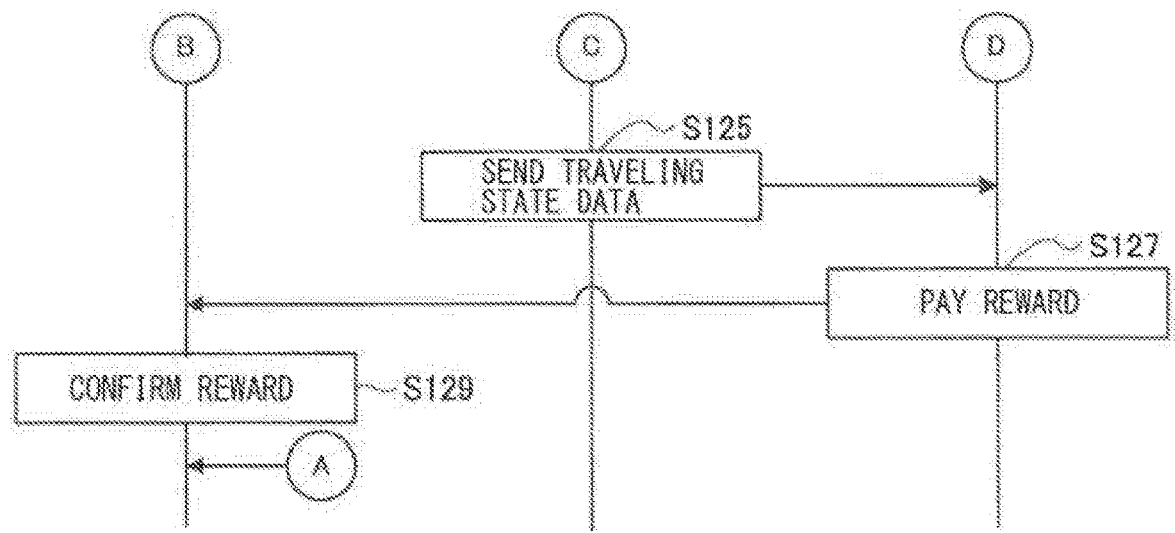
FIG. 5B is a sequence diagram illustrating an exemplary operation of the data collecting system according to another modification example of one example embodiment of the technology.

The data collecting system 100 according to Modification Example 1 of the foregoing embodiment will now be described with reference to FIGS. 5A and 5B. FIGS. 5A and 5B are each a sequence diagram illustrating an exemplary operation of the data collecting system 100 according to Modification Example 1. In Modification Example 1, the request data may include data on a reward for the request. The data on a reward may be set by the client 101. The consignee-side data processing apparatus 200 may output information on the reward expected to be paid, as the acquisition status of the traveling state data. Since other configurations of Modification Example 1 may be substantially the same as those of the first embodiment, the description thereof is not repeated here.

With reference to FIG. 5A, the client 101 may set data on a reward for the request as well as the content of the request, and may upload the request data to send the request data to the server 103 (Step S101'). In Modification Example 1, Steps S103 to S115 after Step S101' may be substantially the same as those in the sequence diagram illustrated in FIG. 3.

In Step S117, the consignee-side data processing apparatus 200 may output information on the reward expected to be paid depending on acquired traveling state data, as the acquisition status of the traveling state data. In one example where the output device 320 is a car navigation system, the consignee-side data processing apparatus 200 may output, to the output device 320, the amount of the reward, the type of the reward, and the content of the reward that depend on the rate of the traveling state data acquired at the time relative to traveling state data required for fulfillment of the request, or the number of flags cleared to fulfill the request. The flags may be preliminarily set in the request data.

The reward may be displayed in a linear fashion that changes depending on the acquisition status of the traveling state data, for example. Alternatively, the reward may be displayed in a nonlinear fashion that sharply increases when the traveling state data exceeds a predetermined threshold or satisfies a predetermined condition, for example. In Modification Example 1, Steps S119 to S123 may be substantially the same as those in the sequence diagram illustrated in FIG. 3.

After the consignee-side data processing apparatus 200 sends the traveling state data to the server 103 in Step S121, the server 103 may send the traveling state data to the client-side data processing apparatus 109 (Step S125). The client 101 may confirm information on the results of fulfillment of the request, and pay a reward depending on the results of the fulfillment (Step S127). The reward may be paid by transmitting the information on the reward from the client-side data processing apparatus 109 to the consignee-side data processing apparatus 200. The consignee 105 may confirm the information on the reward (Step S129).

Alternatively, the reward may be automatically paid by the server 103 in place of the client 101, in Modification Example 1. In this case, a charge for the reward may be sent to the client 101 separately.

The reward may be any item having economic values, such as money or points, or any item having social values, such as honor, positive esteem, or positive comments. The reward may be the provision of service as well as money.

Alternatively, the reward may be paid by a data processing system different from the data collecting system 100 according to the foregoing embodiment. For example, the reward may be paid from the client 101 to the consignee 105 through an electronic payment system using electronic currency, virtual currency, or a credit card. In this case, the information on the reward may not be send to the consignee 105, or may include only a notice before or after the payment for the reward.

According to Modification Example 1, a reward may be paid to the consignee 105 upon the fulfillment of the request. This gives the consignee 105 an incentive to undertake requests. Further, the consignee 105 may determine whether to undertake a request on the basis of a reward. Moreover, the consignee 105 may be allowed to confirm the fulfillment status as the amount of a reward while carrying out the request. This increases the motivation of the consignee 105 to fulfill the request.

In Modification Example 1, the acquisition status of the traveling state data may be outputted as information on a reward expected to be paid depending on acquired traveling state data. However, Modification Example 1 should not be limited thereto. For example, the information on a reward serving as the acquisition status of traveling state data may be outputted with the reward being increased or decreased at a predetermined rate. For example, the consignee-side data processing apparatus 200 may multiply the reward to be paid to the consignee 105 by a factor that changes at a predetermined rate per unit time. Accordingly, the information on the reward to be outputted may change depending on acquired traveling state data.

Such a display of the reward undergoing a change stimulates the speculative sprit of the consignee 105, which results in an increase in the motivation of the consignee 105 to fulfill the request.

Alternatively, the reward may change depending on the history of past requests undertaken, and the reward after being changed may be outputted to the consignee 105, in Modification Example 1. In an example case where the consignee 105 has undertaken a predetermined number or more of requests, the reward may increase in amount or quality depending on the number of the requests undertaken. This allows the consignee 105 to be informed of the reward after being changed and increases the motivation of the consignee 105 to fulfill the request.

1.6. Modification Example 2

Figure 6:
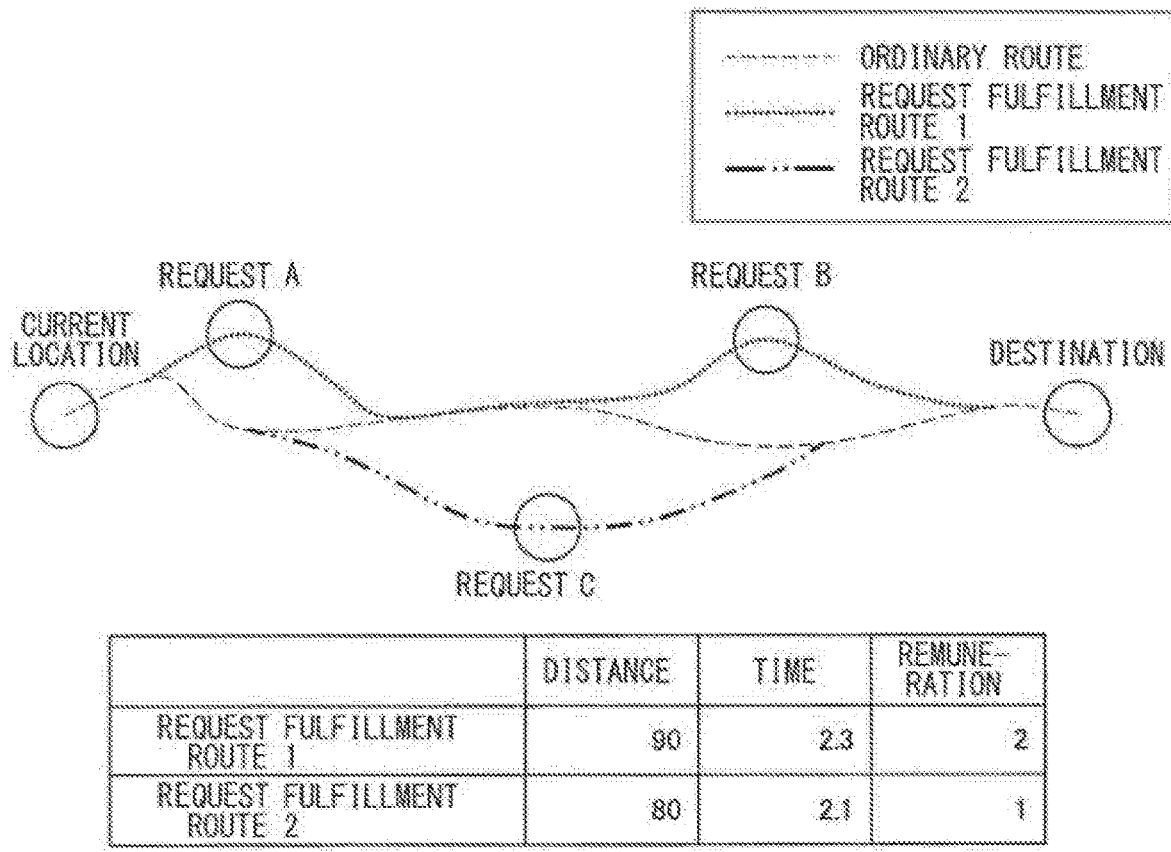
FIG. 6 is a diagram illustrating selection of a traveling route according to one modification example of one example embodiment of the technology.

Another modification example of the data collecting system 100 according to one embodiment will now be described with reference to FIG. 6. FIG. 6 is a diagram illustrating selection of a traveling route according to Modification Example 2. In Modification Example 2, the consignee-side data processing apparatus 200 may receive request data and calculate traveling route data indicative of a traveling route of the vehicle on the basis of the request data. Since other configurations of Modification Example 2 may be substantially the same as those of the first embodiment, the description thereof is not repeated here.

In Modification Example 2, the server 103 may send request data of interest to the consignee-side data processing apparatus 200 (which corresponding to Step S107 in FIG. 3). After receiving the request data from the server 103, the consignee-side data processing apparatus 200 may calculate at least one piece of traveling route data to efficiently fulfill the request on the basis of the content of the request indicated by the request data.

In an example case where the consignee 105 undertakes three requests A, B, and C, the consignee-side data processing apparatus 200 may calculate traveling routes of the vehicle 107 on the basis of the contents of the requests A, B, and C. In this case, as illustrated in FIG. 6, the consignee 105 may be provided with the traveling routes calculated by the consignee-side data processing apparatus 200 including an request fulfillment route 1 (indicated by a dot line) and an request fulfillment route 2 (indicated by a chain double-dashed line). Additionally, the consignee 105 may be provided with a required time, a traveling distance, and information on a reward expected to be paid upon the fulfillment of the request for each of the request fulfillment routes. The consignee 105 may determine a traveling route to be selected on the basis of the information.

According to Modification Example 2, the consignee-side data processing apparatus 200 may calculate the traveling route data on the basis of the received request data. This allows the consignee 105 to efficiently fulfill the request. As a result, it is possible to fulfill the request consistent with the client' 101 wishes and thus enhance the certainty of collecting traveling state data.

Although the traveling route data is calculated by the consignee-side data processing apparatus 200 in Modification Example 2 described above, Modification Example 2 should not be limited thereto. Alternatively, the server 103 may calculate a traveling route on the basis of the request data of interest, and send the traveling route data to the consignee-side data processing apparatus 200. The server 103 may send the traveling route data together with the request data to the consignee-side data processing apparatus 200.

This allows the traveling route data to be calculated without generating an excess load on the consignee-side data processing apparatus 200 and allows the traveling route to be presented to the consignee 105. Since the traveling route data is sent together with the request data from the server 103, it is possible for the consignee 105 to confirm the traveling route immediately after receiving the request data. This allows the consignee 105 to select a request to be undertaken on the basis of the traveling route, and to promptly start carrying out the request.

1.7. Modification Example 3

Another exemplary screen that displays the acquisition status of traveling state data according to Modification Example 3 will now be described with reference to FIG. 7. FIG. is a diagram illustrating another exemplary screen that displays the acquisition status of traveling state data according to Modification Example 3. Modification Example 3 may be different from the first embodiment in that the acquisition status of the traveling state data is represented as an animation. Note that some features of the data collecting system 100 according to Modification Example 3 common to those of the first embodiment are not described hereinafter without redundant description.

While the request is being carried out, an application may cause the consignee-side data processing apparatus 200 to output the acquisition status of the traveling state data as an animation. In one example illustrated in FIG. 7 where the output device 320 is a car navigation system, the consignee-side data processing apparatus 200 may cause a display panel of the output device 320 to output the acquisition status of the traveling state data as an animation. In a case where the acquisition status of the traveling state data is represented by the amount of a reward expected to be paid, the animation may be displayed that indicates coins gradually accumulating in accordance with an increase in the amount of the reward, for example.

In another case where the acquisition status of the traveling state data is represented by the rate of an elapsed time relative to a scheduled fulfillment time, the animation may be displayed that indicates a clock counting up or counting down. In still another case where the acquisition status of the traveling state data is represented by the rate of the distance in which the vehicle has already travelled relative to a scheduled travel distance, the animation may be displayed that indicates a car heading toward the goal on a road.

According to Modification Example 3, the acquisition status of the traveling state data may be represented by an animation. This allows the consignee 105 to confirm the fulfillment status of the request as a reward while the consignee 105 is carrying out the request. Accordingly, it is possible to increase the motivation of the consignee 105 to fulfill the request.

1.8. Modification Example 4

Figure 8A:
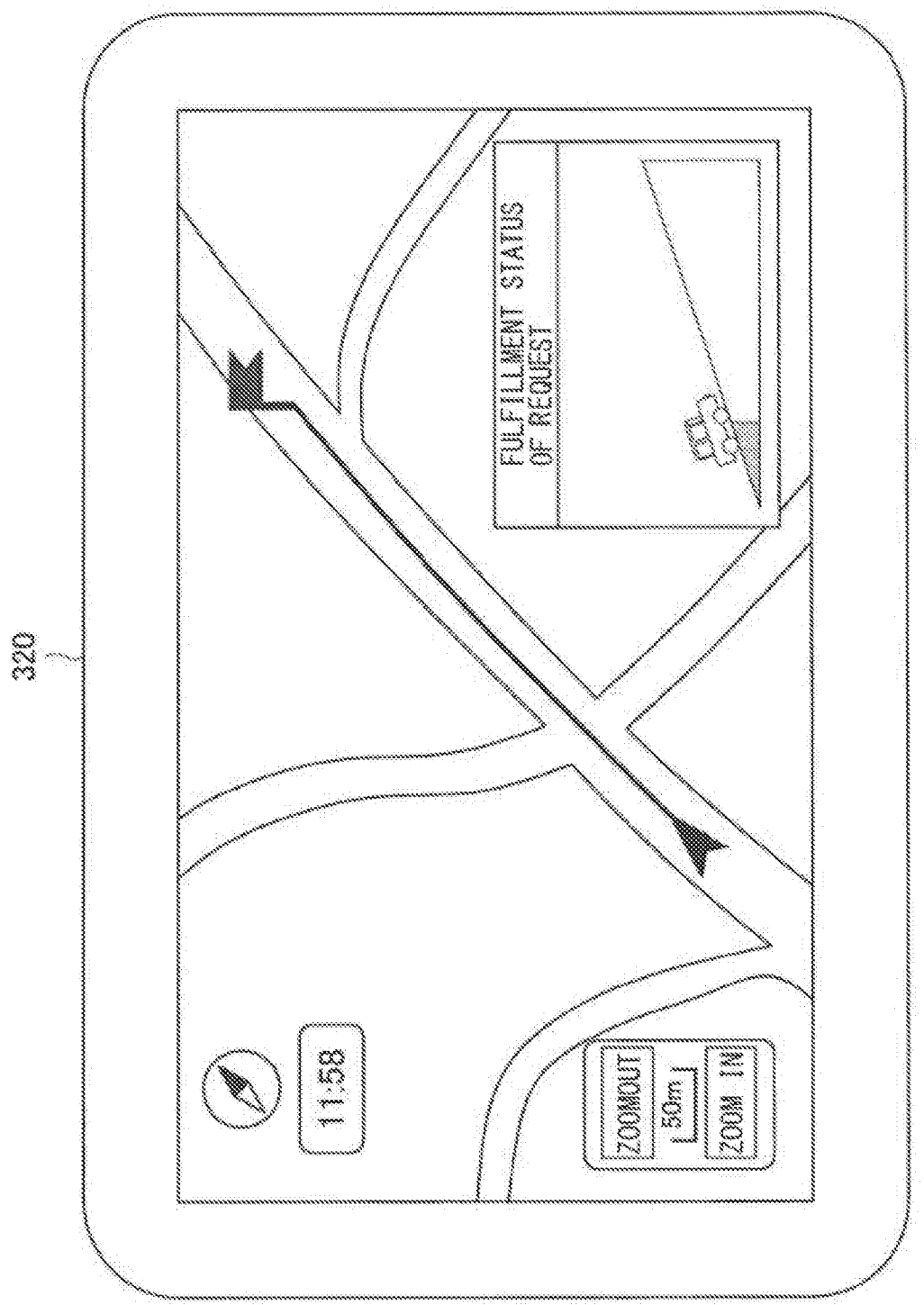
FIG. 8A is a diagram illustrating an exemplary screen that displays the acquisition status of the traveling state data according to one example embodiment of the technology.
Figure 8B:
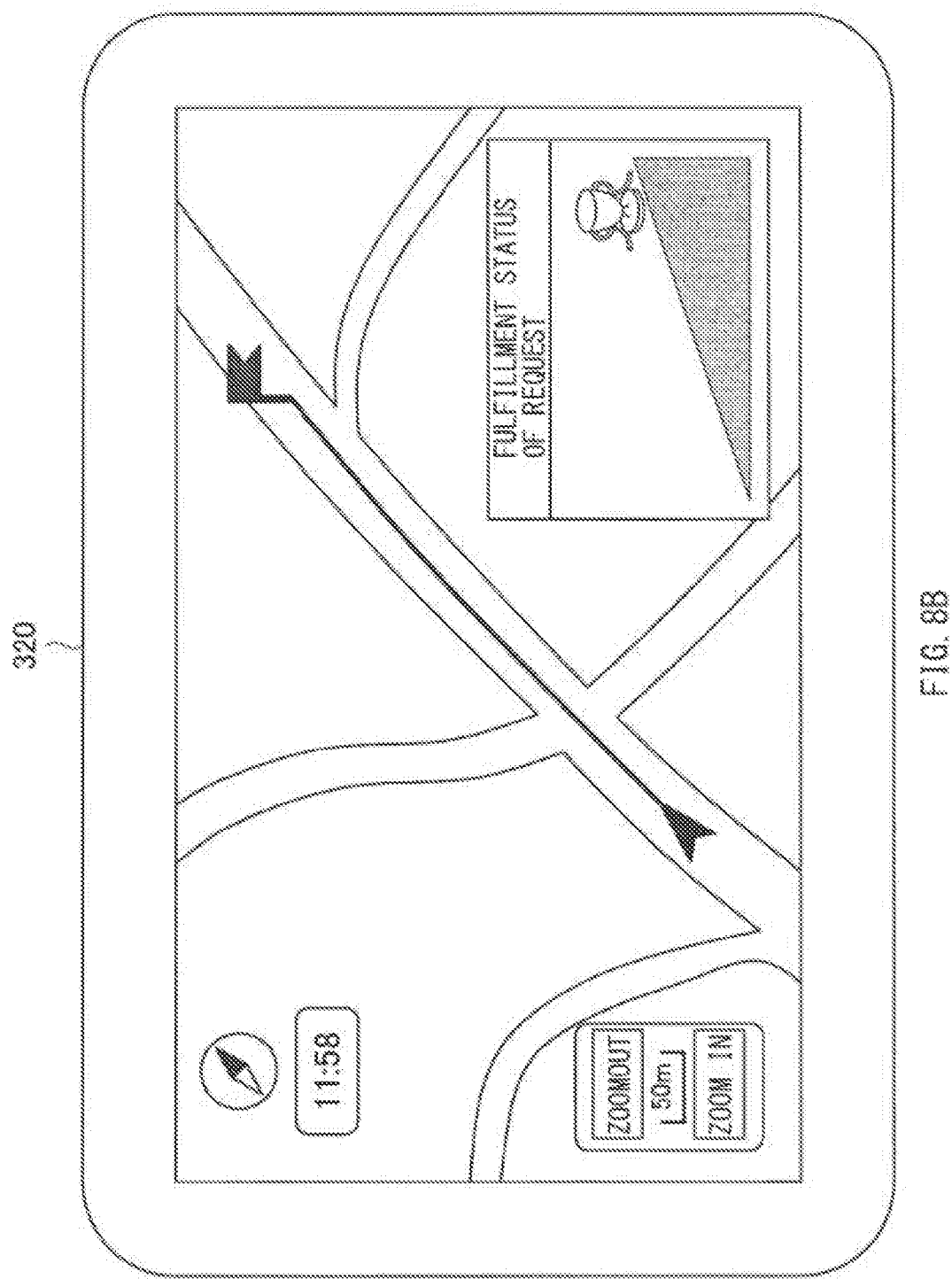
FIG. 8B is a diagram illustrating an exemplary screen that displays the acquisition status of the traveling state data acquired according to one example embodiment of the technology.

Another exemplary screen that displays the acquisition status of traveling state data according to Modification Example 4 will now be described with reference to FIGS. 8A and 8B. FIGS. 8A and 8B are diagrams each illustrating another exemplary screen that displays the acquisition status of traveling state data according to Modification Example 4. Modification Example 4 may be different from the other embodiments and modification examples in that the data collecting system 100 may output an additional item upon the fulfillment of a request. Note that some features of the data collecting system 100 according to Modification Example 4 common to those of the other embodiments or modification examples are not described hereinafter without redundant description.

With reference to FIG. 8A, the acquisition status of traveling state data may be displayed on the output device 320 first. The display may include, for example, an animation of a car climbing a hill. Thereafter, when traveling state data required for fulfillment of the request is completely acquired, an additional item indicating the fulfillment of the request may be displayed as illustrated in FIG. 8B. The additional item may include, for example, an animation of a trophy. Another example of the additional item may include a message such as "Good Job!" or a character appearing to praise for the fulfillment of the request.

According to Modification Example 4, an additional item may be outputted to the consignee 105 upon the fulfillment of the request. This gives the consignee 105 a feeling of accomplishment. Accordingly, it is possible to give the consignee 105 an expectation for a feeling of accomplishment upon the fulfilling of the request and thus increase the motivation of the consignee 105 to fulfill the request.

Although an additional item displayed upon the fulfillment of the request is constant in Modification Example 4, Modification Example 4 should not be limited thereto. For example, the additional item displayed upon the fulfillment of the request may be changed in content at a predetermined rate. This allows various additional items to be displayed upon the fulfillment of the request. Accordingly, it is possible to give the consignee 105 an expectation for a variety of feelings of accomplishment upon the fulfillment of the the request and thus further increase the motivation of the consignee 105.

2. Second Embodiment

Figure 9:
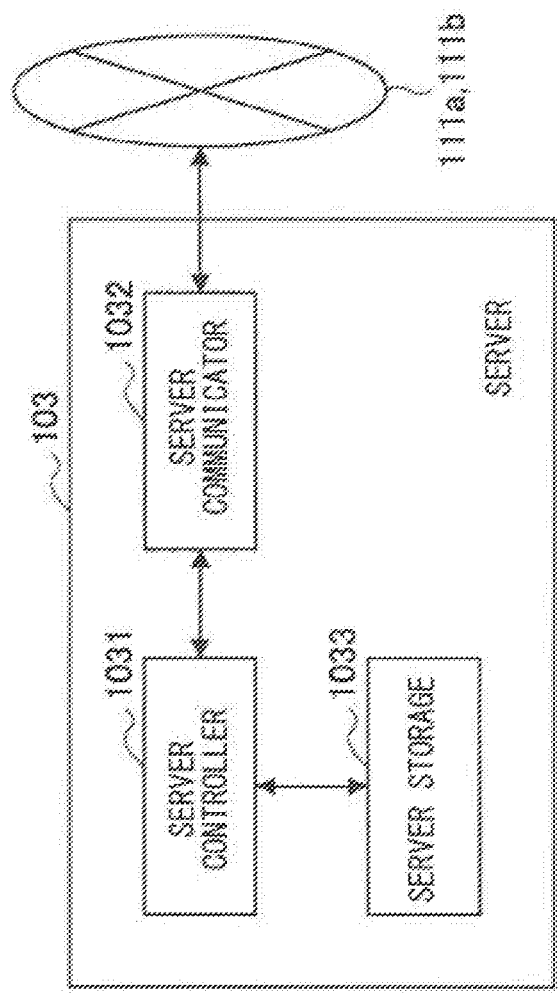
FIG. 9 is a block diagram illustrating an exemplary configuration of a server according to one example embodiment of the technology.
Figure 10A:
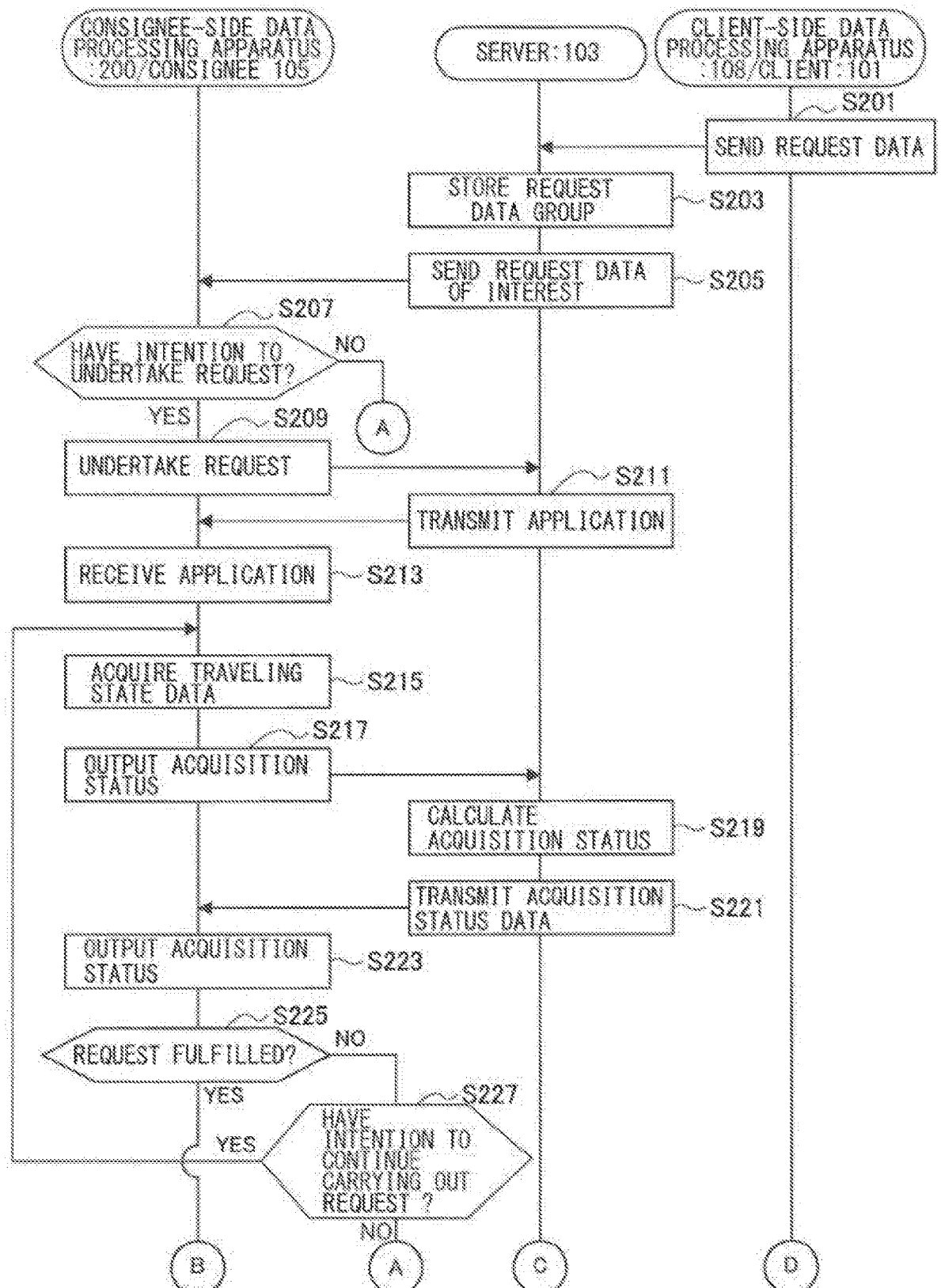
FIG. 10A is a sequence diagram illustrating an exemplary operation of the traveling state data collecting system according to one example embodiment of the technology.
Figure 10B:
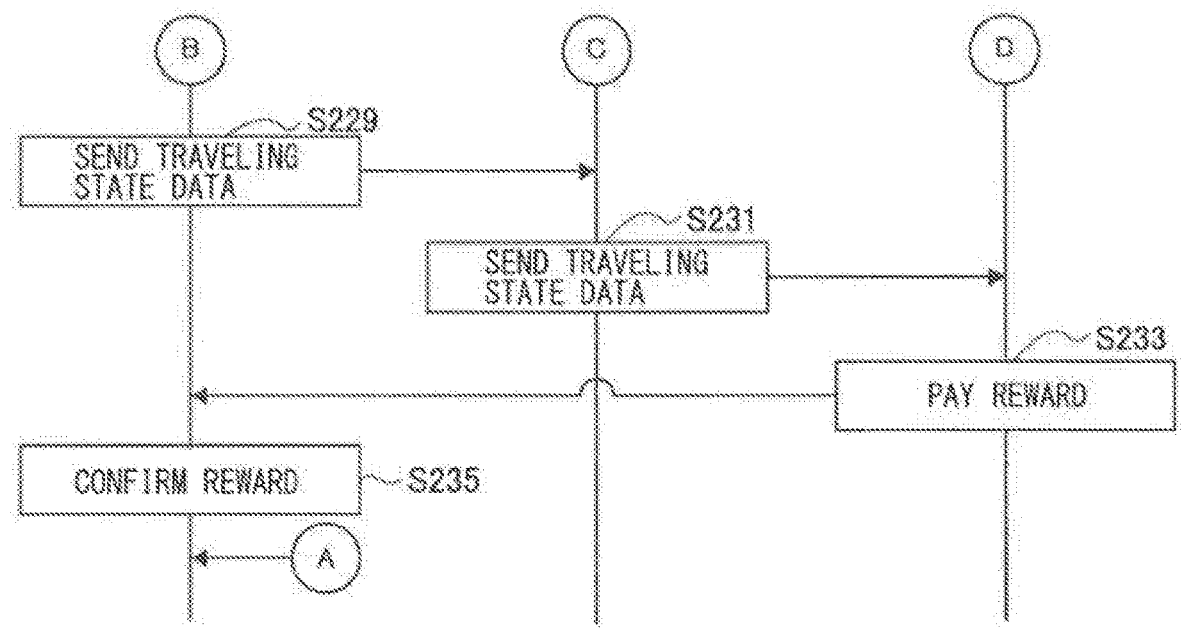
FIG. 10B is a sequence diagram illustrating an exemplary operation of the traveling state data collecting system according to one example embodiment of the technology.

An exemplary operation of the data collecting system 100 according to a second embodiment will now be described with reference to FIGS. 9, 10A, and 10B. FIG. 9 is a block diagram illustrating an exemplary configuration of the server 103 according to the second embodiment. FIGS. 10A and 10B are sequence diagrams each illustrating the exemplary operation of the data collecting system 100 according to the second embodiment. The data collecting system 100 according to the second embodiment may be different from that of the first embodiment in that processing relevant to the display of the acquisition status of the traveling state data may be executed by the server 103. Note that the description on some features of the data collecting system 100 according to the second embodiment common to those of the other embodiments or modification examples is not repeated here without redundant description.

2.1. Exemplary Configuration of Server

With reference to FIG. 9, the server 103 may include a server controller 1031 and a server communicator 1032. The server 103 may further include a server storage 1033.

The server controller 1031 may calculate the acquisition status of traveling state data acquired from the consignee-side data processing apparatus 200. The server controller 1031 may also control processes relevant to various pieces of data transmitted to/from the server 103.

The server communicator 1032 may communicate with the consignee-side data processing apparatus 200 and the client-side data processing apparatus 109 via networks 111a and 111b.

The server storage 1033 may temporarily or permanently store various pieces of data received at the server 103 or data on results of processing.

The server 103 may be, for example, a so-called server computer. The server controller 1031 may have functions implemented by, for example, a CPU, a RAM, and a ROM that are installed in the server computer and operate in cooperation with one another. The server communicator 1032 may have functions implemented by, for example, a communication interface. The server storage 1033 may have functions implemented by, for example, a storage such as a hard disk drive (HDD).

2.2 Exemplary Operation of Data Collecting System

Since Steps S201 to S215 illustrated in FIGS. 10A and 10B may be substantially the same as those in the sequence diagram illustrated in FIG. 3, the description thereof is not repeated here without redundant description. As illustrated in FIG. 10A, the consignee-side data processing apparatus 200 may send traveling state data acquired at the time to the server 103 in Step S217. The server controller 1031 in the server 103 may calculate the acquisition status of the traveling state data in Step S219. The acquisition status of the traveling state data may be, for example, the rate of the distance in which the vehicle has already travelled relative to a scheduled travel distance required for fulfillment of the request, or the rate of an elapsed time from the start of carrying out the request relative to a scheduled fulfillment time required for fulfillment of the request. The server 103 may send a control signal that includes the calculated acquisition status of the traveling state data to the consignee-side data processing apparatus 200 in Step S221.

The consignee-side data processing apparatus 200 may be caused by an application to output the acquisition status of the traveling state data on the basis of the received control signal. In one example where the output device 320 is a car navigation system, the consignee-side data processing apparatus 200 may cause a display panel of the output device 320 to output the acquisition status of the traveling state data in Step S223. Since the steps subsequent to Step S223 illustrated in FIG. 10B are substantially the same as the steps subsequent to Step S119 illustrated in the sequence diagram of FIGS. 5A and 5B, the description thereof is not repeated here without redundant description.

According to the second embodiment described above, the acquisition status of the traveling state data may be calculated by the server 103. This reduces a load of calculation of the acquisition status of the traveling state data on the consignee-side data processing apparatus 200. The consignee 105 is thereby allowed to confirm the fulfillment status of the request as a reward while carrying out the request. Accordingly, it is possible to increase the motivation of the consignee 105 to fulfill the request.

Further, since the consignee-side data processing apparatus 200 may transmit the traveling state data as needed, it is possible to confirm the fulfillment status of the request at the server 103.

Note that the foregoing embodiments and modification examples of the technology are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

Some of the steps of the process illustrated in the sequence diagram described in the foregoing embodiments and modification examples may be omitted or additional steps may be included in the process. Some of the steps may be simultaneously executed or may be carried out in a request different from the request described herein.

Although the fulfillment status of the request is outputted as an image or animation in any of the foregoing embodiments and modification examples, embodiments of the technology should not be limited thereto. Alternatively, the fulfillment status of the request may be outputted as a sound. Still alternatively, the fulfillment status of the request may be outputted as a combination of a sound and an image or animation.

Although the application sent from the server 103 to the consignee-side data processing apparatus 200 outputs the acquisition status of the traveling state data to the consignee-side data processing apparatus 200 in any of the foregoing embodiments and the modification examples, embodiments of the technology should not be limited thereto. Alternatively, the application may be installed in the consignee-side data processing apparatus 200 in advance. Still alternatively, the acquisition status of the traveling state data may be directly outputted from the server 103 to the consignee-side data processing apparatus 200 without using an application.

One or more of the data acquiring unit 211 and the output controller 215 in the controller 210 illustrated in FIG. 2 are implement able by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the data acquiring unit 211 and the output controller 215. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the data acquiring unit 211 and the output controller 215 in the controller 210 illustrated in FIG. 2.

The invention claimed is:

1. A data collecting system comprising:
a data processing apparatus including:
a processor provided in a vehicle and configured to detect, using at least one of a sensor and a GPS system, traveling state data of the vehicle; and
a user interface provided in the vehicle and configured to present information and receives one or more user inputs; and
a server configured to:
store request data including i) a first request for collecting the traveling state data of the vehicle, ii) a first reward associated with the first request, iii) a second request, different from the first request, for collecting the traveling state data of the vehicle, and iv) a second reward associated with the second request;
calculate traveling route data including i) a first request fulfillment route corresponding to the first request and ii) a second request fulfillment route corresponding to the second request, the first request fulfillment route and the second request fulfillment route both extending from a current location of the vehicle, the first request fulfillment route and the second request fulfillment route being different from each other; and
transmit, to the data processing apparatus, the request data and the traveling route data,
wherein the data processing apparatus is configured to:
receive, from the server, the request data and the traveling route data;
present, on the user interface, i) a first line representing the first request fulfillment route, ii) an entire distance of the first request fulfillment route, iii) a first period of time required for the vehicle to travel the first request fulfillment route, iv) the first reward to be earned upon fulfilling the first request by traveling the first request fulfillment route, v) a second line representing the second request fulfillment route, vi) an entire distance of the second request fulfillment route, vii) a second period of time required for the vehicle to travel the second request fulfillment route, and viii) the second reward to be earned upon fulfilling the second request by traveling the second request fulfilment route;
select one of the first request and the second request by selecting the first request fulfillment route corresponding to the first request or the second request fulfilment route corresponding to the second request;
carry out the selected one of the first request and the second request for collecting the traveling state data of the vehicle while the vehicle travels along the first fulfillment route or the second fulfillment route corresponding to the selected one of the first request and the second request;
upon fulfilling the selected one of the first request and the second request of collecting the traveling state data of the vehicle, return the collected traveling state data to the server,
wherein, while the selected one of the first request and the second request is being carried out, the data processing apparatus controls the user interface to display:

in a first display area of the user interface, i) the first fulfillment route or the second fulfillment route corresponding to the selected one of the first request and the second request and ii) a current location of the vehicle on the displayed first fulfillment route or the second fulfillment route corresponding to the selected one of the first request and the second request; and in a second display area of the user interface, a progress toward fulfilling the selected one of the first request and the second request, the progress being displayed in the second display area superimposed on the first display area of the user interface, and wherein the progress is represented by at least one of (1) a rate of i) a distance already travelled by the vehicle from a start of carrying out the selected one of the first request and the second request relative to ii) the entire distance of the first fulfillment route or the second fulfillment route corresponding to the selected one of the first request and the second request and (2) a rate of i) an elapsed time since a start of carrying out the selected one of the first request and the second request relative to ii) the first or second period of time required to travel the first fulfillment route or the second fulfillment route corresponding to the selected one of the first request and the second request.

2. The data collecting system according to claim 1, wherein the first request includes multiple client requests that is sent from one or more clients to the server.

3. The data collecting system according to claim 1, wherein the progress includes a number representation that represents the at least one of (1) a rate of i) a distance already travelled by the vehicle from a start of carrying out the selected one of the first request and the second request relative to ii) the entire distance of the first fulfillment route or the second fulfillment route corresponding to the selected one of the first request and the second request and (2) a rate of i) an elapsed time since a start of carrying out the selected one of the first request and the second request relative to ii) the first or second period of time required to travel the first fulfillment route or the second fulfillment route corresponding to the selected one of the first request and the second request.

4. The data collecting system according to claim 1, wherein the traveling state data of the vehicle includes at least one of a condition of the vehicle, functions of the vehicle, conditions of accessories of the vehicle, and an environment around the vehicle.

* * * * *